United States Patent
Kirchner et al.

(10) Patent No.: US 9,759,231 B2
(45) Date of Patent: Sep. 12, 2017

(54) MID-FRAME FOR A GAS TURBINE AND GAS TURBINE

(71) Applicant: MTU Aero Engines AG, Munich (DE)

(72) Inventors: Daniel Kirchner, Munich (DE); Alois Eichinger, Pfaffenhofen (DE)

(73) Assignee: MTU AERO ENGINES AG, Munich (DE)

( * ) Notice: Subject to any disclaimer, the term of this patent is extended or adjusted under 35 U.S.C. 154(b) by 259 days.

(21) Appl. No.: 14/714,881

(22) Filed: May 18, 2015

(65) Prior Publication Data

US 2015/0330406 A1   Nov. 19, 2015

(30) Foreign Application Priority Data

May 19, 2014   (EP) ................................. 14168796

(51) Int. Cl.
| | |
|---|---|
| *F04D 29/54* | (2006.01) |
| *F01D 25/24* | (2006.01) |
| *F01D 25/26* | (2006.01) |
| *F01D 25/28* | (2006.01) |

(52) U.S. Cl.
CPC ......... *F04D 29/545* (2013.01); *F01D 25/246* (2013.01); *F01D 25/265* (2013.01); *F01D 25/28* (2013.01); *Y02T 50/671* (2013.01)

(58) Field of Classification Search
CPC ...... F04D 29/545; F01D 25/28; F01D 25/265; F01D 25/246; F01D 9/04; F01D 25/243; F01D 9/02; F01D 25/14; F01D 25/26
See application file for complete search history.

(56) References Cited

U.S. PATENT DOCUMENTS

| | | | | |
|---|---|---|---|---|
| 4,184,689 | A * | 1/1980 | Brodell | F01D 11/005 277/637 |
| 4,274,805 | A * | 6/1981 | Holmes | F01D 25/246 415/138 |
| 5,180,282 | A | 1/1993 | Lenhart et al. | |
| 5,273,396 | A | 12/1993 | Albrecht et al. | |
| 5,553,999 | A * | 9/1996 | Proctor | F01D 25/246 415/134 |
| 5,593,277 | A | 1/1997 | Proctor et al. | |
| 6,672,833 | B2 | 1/2004 | MacLean et al. | |
| 7,093,837 | B2 * | 8/2006 | Parker | F23R 3/60 277/630 |
| 2012/0104700 | A1 * | 5/2012 | Peer | F16J 15/3288 277/355 |

FOREIGN PATENT DOCUMENTS

GB         2244523 A    12/1991

* cited by examiner

*Primary Examiner* — Gregory Anderson
*Assistant Examiner* — Eldon Brockman
(74) *Attorney, Agent, or Firm* — Barlow, Josephs & Holmes, Ltd.

(57) ABSTRACT

The invention relates to a mid-frame (10) for a gas turbine, having at least one outer casing element (12) and having a plurality of duct segments (16), which are arranged in succession in the radial direction on the inside of the outer casing element (12) and in the peripheral direction of the casing element (12) and by which segments, in each case, at least one duct (18) through which a gas can flow is delimited at least in the radial direction at least partially, wherein a ring element (22) that is common to the duct segments (16) and is formed in one piece is provided, by means of which the duct segments (16) are held at the outer casing element (12).

12 Claims, 2 Drawing Sheets

MID-FRAME FOR A GAS TURBINE AND GAS TURBINE

BACKGROUND OF THE INVENTION

The invention relates to a mid-frame according to the preamble of patent claim 1 as well as a gas turbine.

Such a mid-frame for a gas turbine and a gas turbine with such a mid-frame are to be taken as being known from U.S. Pat. No. 6,672,833 B2 and U.S. Pat. No. 5,180,282, for example. The mid-frame comprises at least one outer casing element, which is usually referred to as a "casing shell." For example, the casing element is at least essentially annular in form.

The known mid-frame comprises a plurality of duct segments. The duct segments are arranged in the radial direction on the inner side of the outer casing element and are spaced in the radial direction toward the inside at least partially from the outer casing element. Furthermore, the duct segments are arranged in succession in the peripheral direction of the casing element. In other words, the duct segments are arranged one behind the other in the peripheral direction of the casing element. At least one duct through which a gas can flow is delimited at least partially at least in the radial direction by the duct segments. In relation to the direction of gas flow through the duct, the mid-frame is arranged, for example, between two turbine regions of the gas turbine. A first turbine region thereof is, for example, a high-pressure turbine region or a high-pressure turbine, while a second turbine region is, for example, a low-pressure turbine or a low-pressure turbine region of the gas turbine, in particular an aircraft engine.

The gas has a high temperature, for example, and is thus a hot gas, which, by means of the duct, is conducted in the axial direction of the gas turbine from one of the turbine regions to the other of the turbine regions.

Provided here is a segmented construction design of the duct, which is used in conjunction with the manufacturing method thereof owing to the size of the outer casing element, for example. For example, the outer casing element is manufactured by casting, that is, by means of a casting method. Moreover, stresses that can arise owing to a thermal gradient in the duct can be minimized by the segmented construction design, that is, by the use of a plurality of duct segments.

Usually, an individual mounting support is assigned to each of the duct segments, said mount also being referred to as a "hanger." Accordingly, a segmented construction design is also used for these hangers, because the hangers are formed as structural components that are manufactured separately from one another. The respective duct segments are fastened via these hangers to the outer casing element and, in particular, hung from them. The segmented construction design of the holders is used to prevent cracks owing to high thermal stresses during operation.

Owing to the large number of hangers, however, the mounting of the hangers themselves and the duct segments, which is costly in terms of time and expense, leads overall to a mid-frame manufacture that requires considerable time and expense.

BRIEF SUMMARY OF THE INVENTION

The object of the present invention, therefore, is to further develop a mid-frame and a gas turbine of the kind mentioned in the introduction such that the mid-frame can be manufactured in an especially simple way that is time-efficient and cost-effective.

This object is achieved according to the invention by a mid-frame and by a gas turbine of the present invention. Advantageous embodiments with appropriate enhancements of the invention are discussed in detail below, in which advantageous embodiments of the mid-frame are to be regarded as advantageous embodiments of the gas turbine and vice versa.

A first aspect of the invention relates to a mid-frame for a gas turbine, in particular an aircraft engine. The mid-frame is usually also referred to as a "turbine mid-frame." The mid-frame comprises at least one outer casing element. The mid-frame further has a plurality of duct segments. The duct segments are arranged in the radial direction of the outer casing element and thus of the mid-frame inside of the outer casing element. Furthermore, the duct segments are arranged in succession in the peripheral direction of the casing element, that is, they are arranged one behind the other. Owing to the duct segments, at least one duct through which a first gas can flow is at least partially delimited at least in the radial direction in each case. In this way, a segmented construction design of the duct is realized.

Now, in order to realize an especially simple, time- and cost-effective manufacture of the mid-frame, a ring element, which is common to the duct segments and is formed in one piece, is provided according to the invention, by means of which the duct segments are retained at the outer casing element. The ring element is at least partially annular and, in being so, is formed as a ring that is completely closed in the peripheral direction of the outer casing element or as a ring segment.

The invention is based on the idea of not using an individual, separate hanger for each of the duct segments, but rather the ring element that is common to the duct segments is used for holding the duct segments at the outer casing element. Preferably, exactly one ring element that is common to the duct segments is used. In this case, the ring element can be fastened to the outer casing element in a simple and time-efficient way. Moreover, the duct segments themselves can also be fastened to the ring element in an especially simple way. Particularly in comparison to the mounting of a large number of respective hangers, which are manufactured separately from one another, for fastening the duct segments to the outer casing element, it is possible to carry out the mounting and manufacturing in a substantially simpler, time-efficient and cost-effective way. Moreover, the ring element can itself be manufactured cost-effectively.

It has been found to be especially advantageous when the ring element comprises a ring body, from which tabs or arms protrude inward in the radial direction of the outer casing element, the duct segments being retained at the ring element via said tabs or arms. Preferably, it is provided that the ring body and the tabs are formed in one piece with one another. In this case, passage openings, through which the tabs are spaced apart from one another in the peripheral direction, are provided between the tabs in the peripheral direction of the outer casing element and thus of the ring element. The passage openings each have a passage direction that runs in the axial direction of the gas turbine and thus of the outer casing element. This means that the passage openings are open in the axial direction. Furthermore, the passage openings are preferably open inward in the radial direction and are delimited outward in the radial direction by the ring body. Accordingly, the tabs are joined to one another via the ring body.

The passage openings act as relief openings or relief slots between the tabs, so that excessive, thermally induced peripheral stresses can be prevented in the ring element. The individual tabs, at which the duct segments are hung, are thus free of stress in the peripheral direction, at least essentially.

In another advantageous embodiment of the invention, the passage openings are closed by means of a sealing device. In this way, undesired leakage can be prevented, so that it is possible to realize an especially efficient operation of the gas turbine.

Another embodiment of the mid-frame according to the invention is characterized in that the sealing device has at least two layers that have respective sealing elements and are arranged one behind the other in the axial direction. The sealing elements of a first of the layers and the sealing element of a second of the layers are arranged offset with respect to each other in the peripheral direction and mutually overlap partially in the axial direction. In this way, it is possible to achieve an especially good sealing effect. The passage openings between the tabs are intervening spaces, which can be closed by the segmented sealing elements and thus sealed. For example, the sealing element can be made from a metallic material. In this case, the sealing elements are constructed, for example, as sheet metal seals. A packet of sheet metal seals can be displayed thereby, which ensures an especially good sealing effect.

In another embodiment of the invention, a chamber that at least partially surrounds the duct is at least partially delimited by the outer casing element and the duct segments and another gas that has a higher pressure than the first gas flowing through the duct can be admitted to said chamber. The other gas involves, for example, sealing air that can flow at least partially around the duct segments on the outer peripheral side. In this way, the duct segments can be cooled.

The first gas flowing through the duct can be, for example, a hot gas, so that the duct is constructed as a hot-gas duct. In this case, the other gas (sealing gas) has a substantially lower temperature than the first gas. The chamber is constructed, for example, as an annulus, through which the other gas can flow. The mentioned sealing gas acts as cooling air, by means of which the outer casing element and the duct segments can be cooled. The mentioned sealing device seals the chamber especially well, particularly against the duct, so that any undesired escape of sealing air from the chamber can be prevented.

In order to accomplish an especially good sealing effect of the sealing device, it has been shown to be advantageous when the sealing elements are arranged on a side of the ring element facing the chamber, in particular on a side facing the tabs. Because the other gas has a higher pressure than the first gas, a higher pressure prevails on the side of the ring element facing the chamber than on a second side facing away from it. As a result of this higher pressure, the sealing elements are pressed together and against the ring element, so that the sealing effect is enhanced still further.

Another embodiment is characterized in that the duct segments are each fastened to the ring element by means of at least one screw bolt connection. On the one hand, an especially rigid retaining of the duct segments to the ring element can hereby be accomplished. On the other hand, it is possible to realize an especially simple, time-efficient and cost-effective mounting.

In another embodiment of the invention, it is provided that the ring element is held at the outer casing element by means of at least one screw bolt connection. In this way, the ring element can be mounted especially simply and rigidly at the outer casing element.

Finally, it has been shown to be advantageous when the ring element can be arranged or is arranged in the axial direction partially between the outer casing element and at least one other casing element of the gas turbine and can be fixed in place in the radial direction by clamping the ring element between the casing elements. In this way, it is possible for the number of fastening elements for holding the ring element at the outer casing element to be kept especially small, so that the number of parts, the weight, and the costs of the mid-frame can overall be kept especially small. Furthermore, there exists the possibility that the ring element and/or the duct segment has at least one hook, with the hook being designed so as to engage in a corresponding groove of the duct segment and/or the ring element.

In another advantageous embodiment of the invention, the ring element together with its structural components can be manufactured in one piece by means of an additive manufacturing method. As a result, a simple and cost-effective manufacture of the ring element is possible.

A second aspect of the invention relates to a gas turbine having at least one mid-frame described in the preceding discussion. In this case, the duct is arranged between two turbine regions of the gas turbine in the direction of flow of the gas through the duct. A first turbine region is, for example, a high-pressure turbine region or a high-pressure turbine of the gas turbine, while a second turbine region is a low-pressure turbine region or a low-pressure turbine of the gas turbine, in particular of the aircraft engine.

BRIEF DESCRIPTION OF THE DRAWINGS

Further advantages, features, and details of the invention ensue from the following description of a preferred exemplary embodiment as well as on the basis of the drawings. The features and combinations of features mentioned above in the description as well as features and combinations of features mentioned below in the descriptions of the figures and/or only shown in the figures can be used not only in the respectively presented combination, but also in other combinations or by themselves, without departing from the scope of the invention.

Shown are.

In the figures, identical or functionally identical elements are furnished with the same reference numbers.

DETAILED DESCRIPTION OF THE INVENTION

Figure 1:
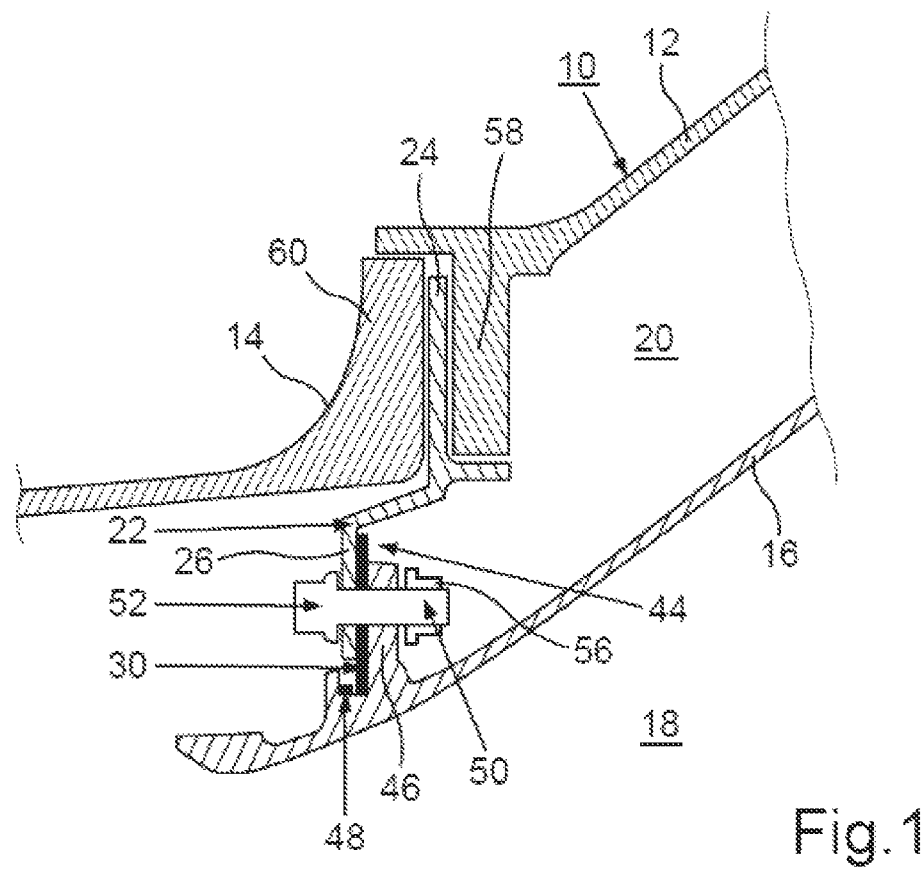
FIG. 1 a schematic longitudinal sectional view of a mid-frame according to the invention for a gas turbine, having a plurality of duct segments, which are retained at an outer casing element of the mid-frame via a ring element that is common to the duct segments and is constructed in one piece.

FIG. 1 shows, in a schematic longitudinal view, a mid-frame, identified overall by reference 10, for a gas turbine. The mid-frame 10 is usually also referred to as a "turbine mid-frame" and comprises at least one outer casing element 12. The outer casing element 12 is, for example, an outer casing shell, which can be designed to be annular in form, at least essentially.

The mid-frame 10 can further comprise at least one hub element, not visible in FIG. 1, of a hub of the mid-frame 10. The hub element is arranged in the radial direction of the gas turbine and of the outer casing element 12 on the inside of the outer casing element 12. The outer casing element 12 is, for example, joined to the hub element through struts, the arrangement of said struts being distributed in the peripheral direction of the hub element over its periphery.

The gas turbine, in particular an aircraft engine, comprises, for example, at least two turbine regions. A first of the turbine regions is designed as a low-pressure turbine region or low-pressure turbine, while a second of the turbine regions is designed as a high-pressure turbine region or high-pressure turbine of the gas turbine. The low-pressure turbine comprises at least one rotor, which can rotate around an axis of rotation or an engine axis relative to the outer casing element 12. The high-pressure turbine, too, comprises at least one rotor, which can rotate around the axis of rotation relative to the outer casing element 12. At least one of the rotors is mounted, for example, at the hub element so as to rotate around the axis of rotation relative to the hub element and the outer casing element 12. For this purpose, the at least one rotor is arranged, for example, at least partially in the hub element or in a hub chamber or bearing chamber that is delimited at least partially by the hub element. Shown in FIG. 1, in cutout, is another casing element 14 of the gas turbine. The casing element 14 is, for example, a casing element of the high-pressure turbine.

The mid-frame 10 comprises a plurality of duct segments, one of which, a duct segment identified by 16, can be seen in FIG. 1. The following discussions regarding the duct segment 16 can also be transferred to the other duct segments in a straightforward manner. The duct segments 16 are arranged in the radial direction on the inner side of the outer casing element 12 and in the radial direction inward at least partially spaced apart from the outer casing element 12. Preferably, the duct segments 16 are spaced in the radial direction inward completely apart from the outer casing element 12, so that they do not come into contact with the outer casing element 12.

Moreover, the duct segments are arranged in succession, that is, one behind the other, in the peripheral direction of the outer casing element 12. In each case, at least one duct through which a first gas can flow is delimited at least partially by the duct segments 16 at least in the radial direction. The duct that is delimited by the duct segment 16 at least partially in the radial direction of the outer casing element 12 is identified in FIG. 1 by reference 18.

The gas flowing through the duct 18 exhibits a high temperature and is thus a hot gas, which is conducted from the high-pressure turbine to the low-pressure turbine by means of the duct 18. Accordingly, the duct 18 is arranged between the high-pressure turbine and the low-pressure turbine in the direction of flow of the hot gas through the duct 18, while the low-pressure turbine is arranged downstream of the high-pressure turbine and downstream of the mid-frame 10.

It can further be seen in FIG. 1 that a chamber 20 surrounding the duct 18 is delimited at least partially by the outer casing element 12 and the duct segments 16, with the chamber 20 being designed as an annulus. Therefore, the duct segments 16 are also referred to as "annulus segments." The annulus is arranged at least in the radial direction on the outside of the duct segment 16 and thus between the respective duct segment and the outer casing element 12 in the radial direction.

Another gas in the form of a sealing air can be admitted to the annulus (chamber 20). This means that sealing air can be fed into the chamber 20. This sealing air can flow around the respective duct segments 16 on the outer peripheral side and around the outer casing element 12 on the inner peripheral side and has a higher pressure in comparison to the hot gas, but a lower temperature. Accordingly, the sealing air acts as cooling air, by means of which the duct segments 16 and the outer casing element 12 can be cooled. The sealing air is blown into the chamber 20, for example.

Now, in order to realize an especially simple mounting and manufacture of the mid-frame 10, a ring element 22, which is common to the duct segments and is formed in one piece, is provided, by means of which the duct segments 16 are held at the outer casing element 12. The ring element can be designed, in particular, in one piece. The ring element 22 can also be seen in FIG. 2 in cutout. In the present case, the ring element 22 is at least predominantly closed, in particular completely closed, in the peripheral direction of the casing element 12. The use of a ring element 22 that is completely closed in the peripheral direction in the present case dispenses with the use of an individual hanger for each of the duct segments 16. Instead of this large number of mutually separate hangers, the one-piece ring element 22 can be used. Through the use of the ring element 22, it is also possible to seal the chamber 20 especially well, because, in contrast to the use of a large number of hangers, segment gaps are eliminated. As a result, excessive leakage of cooling air from the chamber 20 can be prevented.

Figure 2:
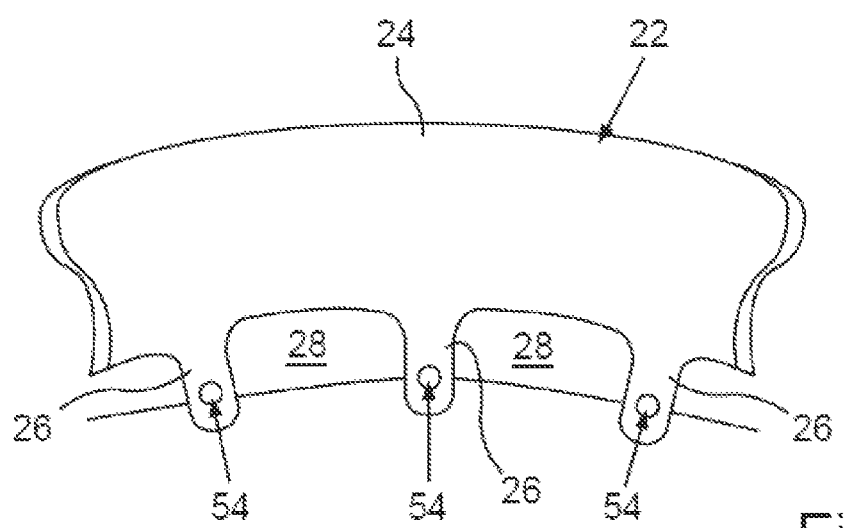
FIG. 2 a schematic cutout front view of the ring element according to FIG. 1.

It is especially well seen from FIG. 2 that the ring element 22 has a ring body 24, which is formed at least essentially in the manner of a surrounding ring that is at least predominantly, in particular completely, closed. The ring element 22 further comprises tabs 26, which protrude in the radial direction inward from the ring bodies 24. In this case, the tabs 26 are formed together with the ring body 24 in one piece. Respective passage openings 28 are provided between the tabs 26 in the peripheral direction. The tabs 26 are spaced apart in the peripheral direction via these passage openings. In this case, the passage openings 28 have respective passage directions, which run in the axial direction. This means that the passage openings 28 are open in the axial direction. Moreover, the passage openings 28 are also open inward in the radial direction. In the radial direction outward, the passage openings 28 are delimited by the ring body 24. The passage openings 28 act as relief slots, by means of which excessive, thermally induced peripheral stresses in the ring element 22 can be prevented.

Figure 3:
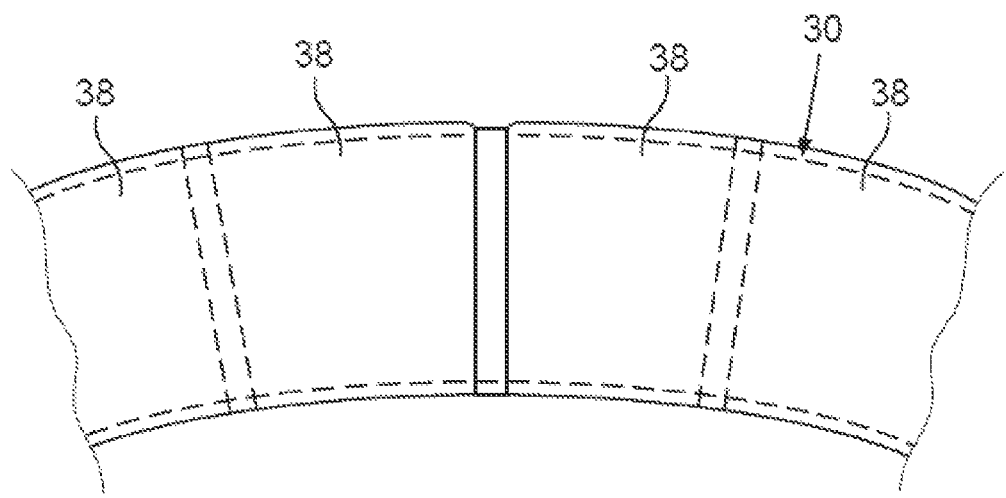
FIG. 3 a schematic cutout front view of a sealing device of the mid-frame according to the invention.
Figure 4:
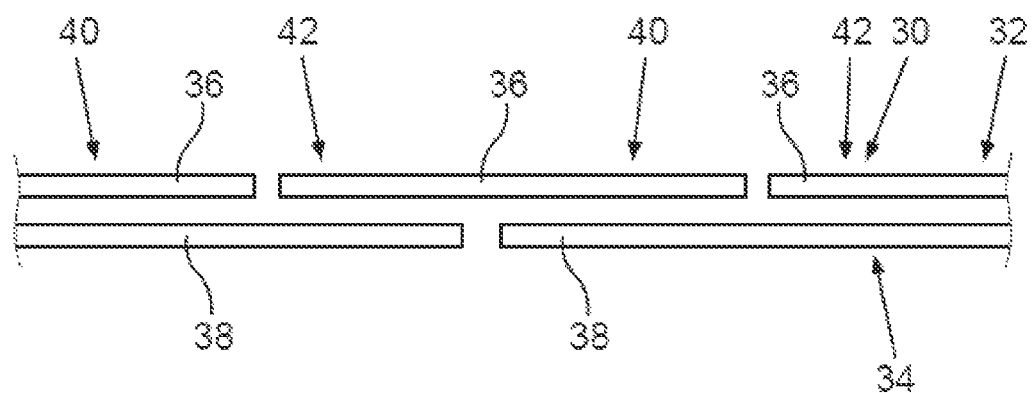
FIG. 4 a schematic cutout plan view of the sealing device according to FIG. 3.

Provided in the finished manufactured state of the mid-frame 20 is a sealing device 30, which can be seen especially well in FIGS. 3 and 4 and by means of which the passage openings 28 are closed and sealed. In this way, an excessive escape of sealing air from the chamber 20 can be prevented.

It can be seen especially well in FIG. 4 that the sealing device 30 has two layers 32 and 34, which have respective sealing elements 36 and 38 and are designed one behind the other in the axial direction. The sealing elements 38 are designed as sealing plates. For example, the sealing elements 36, 38 are formed from a metallic material, it being possible to form the sealing elements 36, 38 from sheet metal seals. The sealing elements 36 of the first layer 32 and the sealing elements 38 of the second lager 34 are arranged offset with respect to each other in the peripheral direction of the outer casing element 12 and mutually overlap partially in the axial direction. It can be seen especially well in FIG. 4 that the sealing elements 36, 38 are arranged offset in the manner of a brick wall.

This means that, in each case, a sub-region 40 of a first of the sealing elements 36 and a sub-region 42 of a second of the sealing elements 36 are overlapped in the axial direction by one of the sealing elements 38 that is common to the sub-regions 40, 42. In other words, in each case, one of the sealing elements 38 overlaps respective sub-regions of two of the sealing elements 36 in the axial direction. In this way, it is possible to realize an especially advantageous sealing effect. In relation to the axial direction, the sealing elements 38 are arranged on a side of the sealing elements 36 that faces the chamber 20.

Moreover, it can be seen from FIG. 1 that the sealing elements 36, 38 are arranged on a side 44 of the ring element 22, in particular of the tabs 26, which faces the chamber 20 in the axial direction. Because a higher pressure prevails in the chamber 20 than in the duct 18, the sealing elements 36, 38 are as a result pressed against each other and against the ring element 22. As a result, the sealing effect is enhanced still further.

It can be further seen from FIG. 1 that the sealing elements 36, 38 of the sealing device 30 are arranged between the tabs 26 and a support flange 46 of the duct segment 16. As a result, the sealing elements 36, 38 are clamped and positioned securely between the tabs 26 and the support flange 46.

Created by the sealing elements 36, 38 is a packet of sheet metal seals, which, for example, is accommodated at least partially in a corresponding groove 48 of the respective duct segment. In this way, on the one hand, the packet of sheet metal seals is guided. On the other hand, a guiding and positioning of the packet of sheet metal seals is brought about by a pretensioning, which is effected by means of a screw bolt connection 50 that can be seen in FIG. 1. It can be seen by way of the screw bolt connection 50 as an example that the duct segments can be fastened by means of the at least one respective screw bolt connection at the ring element 22.

The screw bolt connection 50 comprises a screw element in the form of a screw bolt 52, which passes through respective passage openings 54 (FIG. 2) of the tabs 26 as well as respective passage openings of the sealing elements 36, 38 and of the support flange 46. Provided at the support flange 46 is another screw element in the form of a nut 56 in the present case. The screw bolt 52 has an outer thread, while the nut 56 has an inner thread that corresponds to the outer thread. In this case, the screw bolt 52 is screwed via its outer thread into the inner thread of the nut, so that, as a result, the duct segment 16 is fastened to the ring element 22. Furthermore, the sealing elements 36, 38 are clamped between the support flange 46 and the tabs 26 by means of the screw bolt connection 50.

The nut 56 is designed as a riveting nut, for example. Alternatively or additionally to the fastening of the duct segment 16 to the ring element 22 brought about by means of the screw bolt connection 50, a different fastening of the duct segment 16 to the ring element 22 can be provided. For example, the duct segment 16 is held at the ring element 22 in a form-fitting manner. For this purpose, for example, the duct segment 16 or the ring element 22 has a hook, which engages in a corresponding groove of the ring element 22 or of the duct segment 16. In this way, a connection between the duct segment 16 and the ring element 22 is realized by a groove-hook concept (not depicted).

For the radial holding of the ring element 22 at the outer casing element 12, the outer casing element 12 has a flange 58. Moreover, the casing element 14 has a flange 60. The flange 60 is overlapped in the axial direction at least partially by the flange 58 and vice versa. The casing elements 12, 14 are joined to each other via the flanges 58, 60. Moreover, a flange of the ring element 22, which is formed by the ring body 24, for example, is arranged in the axial direction between the flanges 58, 60 and clamped between the flanges 58, 60. As a result, the duct segment 16 is retained in the radial direction at the outer casing element 12.

Alternatively or additionally, another retaining of the ring element 22 at the outer casing element 12 can be provided. In this case, it is conceivable to fasten the ring element 22 by means of at least one separate screw connection, that is, a screw bolt connection, at the outer casing element 12. The ring element 22, together with its structural components, can additionally be manufactured in one piece by means of an additive manufacturing method.

The invention claimed is:

1. A mid-frame (10) for a gas turbine, having at least one outer casing element (12) and having a plurality of duct segments (16), which are arranged in succession in the radial direction on the inside of the outer casing element (12) and in the peripheral direction of the outer casing element (12) and by which segments, in each case, at least one duct (18) through which a first gas can flow is delimited at least in the radial direction at least partially, comprising a ring element (22) that is common to the duct segments (16) and is formed in one piece and the duct segments (16) are held at the outer casing element (12);

the ring element (22) having a ring body (24), from which tabs (26) protrude in the radial direction inwardly, where the duct segments (16) are retained at the ring element (22) by the tabs (26), with passage openings (28) defined between the tabs (26) in the peripheral direction, openings between the tabs (26) are spaced apart from one another in the peripheral direction.

2. The mid-frame (10) according to claim 1, wherein the passage openings (28) are closed by means of a sealing device (30).

3. The mid-frame (10) according to claim 2, wherein the sealing device (30) has at least two layers (32, 34) that have respective sealing elements (36, 38) and are arranged one behind the other in the axial direction, with the sealing elements (36) of a first of the layers (32, 34) and the sealing elements (38) of a second of the layers (32, 34) being arranged offset with respect to each other in the peripheral direction and mutually overlapping partially in the axial direction.

4. The mid-frame (10) according to claim 1, further comprising:

a chamber (20) that at least partially surrounds the duct (18) is delimited by the outer casing element (12) and the duct segments (16) and another gas, which has a higher pressure in comparison to the first gas, is admitted to the chamber.

5. The mid-frame (10) according to claim 3, wherein the sealing elements (36, 38) are arranged on a side (44) of the ring element (22), which faces the chamber (20).

6. The mid-frame (10) according to claim 1, wherein the duct segments (16) are each fastened to the ring element (22) by at least one screw bolt connection (50).

7. The mid-frame (10) according to claim 1, wherein the ring element (22) is retained at the outer casing element (10) by at least one screw bolt connection (50).

8. The mid-frame (10) according to claim 1, wherein the ring element (22) is arranged in the axial direction partially between the outer casing element (12) and at least one other casing element (14) of the gas turbine and is clamped between the casing elements (12, 14).

9. The mid-frame (10) according to claim 1, wherein the ring element (22) is formed in one piece.

10. The mid-frame (10) according to claim 1, wherein at least one mid-frame is a component of a gas turbine.

11. A mid-frame (10) for a gas turbine, having at least one outer casing element (12) and having a plurality of duct segments (16), which are arranged in succession in the radial direction on the inside of the outer casing element (12) and in the peripheral direction of the outer casing element (12) and by which segments, in each case, at least one duct (18) through which a first gas can flow is delimited at least in the radial direction at least partially, comprising a ring element (22) that is common to the duct segments (16) and is formed in one piece and the duct segments (16) are held at the outer casing element (12);

wherein the ring element (22) has a ring body (24), from which tabs (26) protrude in the radial direction inwardly, where the duct segments (16) are retained at the ring element (22), with passage openings (28) defined between the tabs (26) in the peripheral direction, openings between the tabs (26) are spaced apart from one another in the peripheral direction;

wherein the passage openings (28) are closed by means of a sealing device (30);

wherein the sealing device (30) has at least two layers (32, 34) that have respective sealing elements (36, 38) and are arranged one behind the other in the axial direction, with the sealing elements (36) of a first of the layers (32, 34) and the sealing elements (38) of a second of the layers (32, 34) being arranged offset with respect to each other in the peripheral direction and mutually overlapping partially in the axial direction.

12. The mid-frame (10) according to claim 11, wherein the sealing elements (36, 38) are arranged on a side (44) of the ring element (22), which faces the chamber (20).

* * * * *